United States Patent
Neville et al.

(10) Patent No.: US 9,328,502 B2
(45) Date of Patent: May 3, 2016

(54) DOME HUBS, DOME ASSEMBLY KITS, AND DOME ASSEMBLY METHODS

(71) Applicant: Garden Right, LLC, Salt Lake City, UT (US)

(72) Inventors: Daniel D. Neville, Salt Lake City, UT (US); Rex C. Haddock, Salt Lake City, UT (US)

(73) Assignee: Garden Right, LLC, North Salt Lake, UT (US)

( * ) Notice: Subject to any disclaimer, the term of this patent is extended or adjusted under 35 U.S.C. 154(b) by 0 days.

(21) Appl. No.: 14/511,086

(22) Filed: Oct. 9, 2014

(65) Prior Publication Data

US 2015/0101645 A1     Apr. 16, 2015

Related U.S. Application Data

(60) Provisional application No. 61/890,101, filed on Oct. 11, 2013.

(51) Int. Cl.
| | |
|---|---|
| *E04B 1/19* | (2006.01) |
| *E04B 1/32* | (2006.01) |
| *A01G 9/14* | (2006.01) |
| *A01G 9/16* | (2006.01) |
| *E04B 7/10* | (2006.01) |

(52) U.S. Cl.
CPC ............ *E04B 1/1903* (2013.01); *A01G 9/1407* (2013.01); *A01G 9/16* (2013.01); *E04B 1/3211* (2013.01); *E04B 7/105* (2013.01); *E04B 2001/1966* (2013.01); *E04B 2001/3247* (2013.01); *E04B 2001/3252* (2013.01); *Y10T 29/49826* (2015.01)

(58) Field of Classification Search
CPC ................ E04B 2001/3247; E04B 2001/3294; E04B 1/1903; E04B 2001/1966
USPC .......... 135/125, 135, 120.3, 909, 98; 52/81.1, 52/81.3; 403/171, 176
See application file for complete search history.

(56) References Cited

U.S. PATENT DOCUMENTS

| | | | |
|---|---|---|---|
| 3,877,824 A | 4/1975 | Jury | |
| 4,026,313 A * | 5/1977 | Zeigler | 135/143 |
| 4,077,417 A * | 3/1978 | Beavers | 135/121 |
| 4,194,851 A | 3/1980 | Littlefield | |
| 4,569,165 A * | 2/1986 | Baker et al. | 52/81.3 |
| 4,679,961 A * | 7/1987 | Stewart | 403/341 |
| 4,981,387 A * | 1/1991 | Younjae | 403/174 |

(Continued)

OTHER PUBLICATIONS

International Search Report and Written Opinion, International Application No. PCT/US2014/059963, Jan. 22, 2015.

*Primary Examiner* — Noah Chandler Hawk
(74) *Attorney, Agent, or Firm* — Parsons Behle & Latimer

(57) ABSTRACT

A dome hub includes a body and a spoke extending radially from the body. The spoke is configured to receive a dome strut. The spoke includes a strut band configured to receive an end of a dome strut. A dome assembly kit includes a strut and a hub. The hub retains the strut within a spoke without threaded fasteners when assembled. The spoke includes a strut band that receives an end of the strut when assembled. A dome assembly method includes using a hub with a spoke and a strut band. The method includes using a strut and inserting the strut into the spoke. The strut is retained within the spoke without threaded fasteners. The method includes sliding the strut toward a center of the hub until an end of the strut is positioned against the strut band.

21 Claims, 5 Drawing Sheets

(56) References Cited

U.S. PATENT DOCUMENTS

| | | |
|---|---|---|
| 5,255,993 A | 10/1993 | Kovacs |
| 5,732,726 A * | 3/1998 | Lee .................. 135/156 |
| 6,032,430 A * | 3/2000 | Soukup ............ 52/656.9 |
| 6,108,984 A * | 8/2000 | Davidson ........ E04B 1/3211 403/171 |
| 6,167,898 B1 * | 1/2001 | Larga et al. ........ 135/137 |
| 6,296,415 B1 | 10/2001 | Johnson et al. |
| 7,766,796 B2 * | 8/2010 | Pizmony ............. 482/35 |
| 7,896,016 B2 * | 3/2011 | Shi .................. 135/147 |
| 8,820,025 B1 * | 9/2014 | Rochas ............. 52/653.2 |
| 2006/0291952 A1 * | 12/2006 | Wood ............ E04B 1/3211 403/217 |
| 2008/0307720 A1 | 12/2008 | Howe |
| 2011/0168220 A1 * | 7/2011 | Prusmack ........... 135/135 |

\* cited by examiner

DOME HUBS, DOME ASSEMBLY KITS, AND DOME ASSEMBLY METHODS

CROSS REFERENCE TO RELATED APPLICATIONS

The present application claims the benefit of priority under 35 U.S.C. §119 to U.S. Provisional Application No. 61/890,101, filed Oct. 11, 2013, entitled "Geodesic Dome Hub Devices and Methods," the disclosure of which is hereby incorporated by reference in its entirety.

BACKGROUND

Dome structures are well known. Geodesic dome structures have been used for greenhouses, event shelters, emergency shelters and even long term buildings, such as houses. Geodesic dome structures provide an efficient use of materials per square foot of space and are structurally stable in many kinds of extreme weather. Additionally, they are efficient to heat and cool because they do not have volumetric dead spaces exhibited by rectangular and square structures.

Geodesic domes known in the prior art are often joined by one of two ways. In the first method, the ends of struts are flattened and a hole is drilled through the flattened end of each strut. A long bolt, washer, and nut are used to fasten the struts together. The struts may then be bent to the correct angle. In the second method, the flattened, drilled ends of the struts are connected to a common disk by a plurality of fasteners. Both of these methods require fasteners to hold the struts together.

However, it has been found that geodesic domes using struts with flattened ends may provide too little support for the structure. The inherent strength in a strut, such as in a cylindrical strut, is greatly diminished when the ends of the struts are flattened. Additionally, assembly of these geodesic domes may be cumbersome and time consuming. Each of these methods requires multiple builders to assist in assembly of the geodesic dome and the struts must be manipulated to form the correct angle. Tools are required to assemble and disassemble the dome. These problems may result in increased costs, increased assembly and disassembly time, inferior structural characteristics, and limited structure size.

BRIEF DESCRIPTION OF THE DRAWINGS

Some embodiments are described below with reference to the following accompanying drawings.

DETAILED DESCRIPTION

Figure 1:
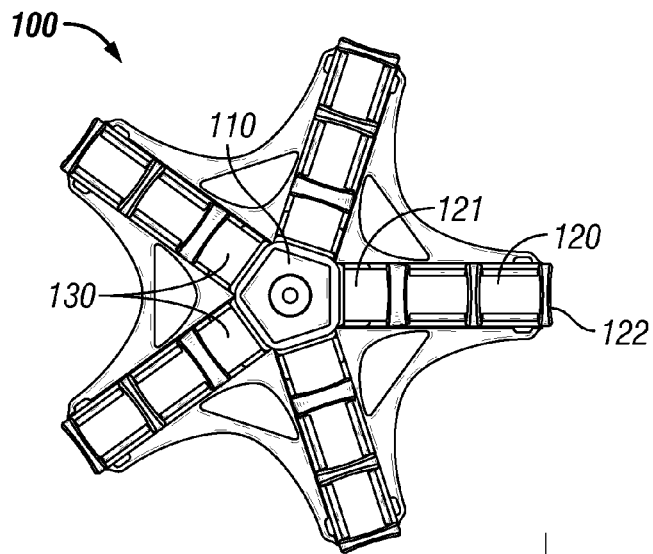
FIG. 1 shows a front view of a hub having 5 spokes.

The devices and methods herein relate generally to domes, such as geodesic domes, and, more specifically, to a hub used to connect struts without any supplemental hardware.

The devices and methods herein overcome some of the problems and disadvantages discussed above. Some of the benefits of the devices and methods herein include increased strength, reduced assembly time, the ability for a dome to be constructed by a single person, and reduced use of tools, washers, bolts, and nuts in the assembly. The devices and methods herein also do not necessarily require flattening the ends of struts before assembly.

Herein, a dome hub includes a body and a spoke extending radially from the body. The spoke is configured to receive a dome strut. The spoke includes a strut band configured to receive an end of a dome strut.

By way of example, the spoke may include an engagement slot having a first edge and an opposing second edge with a gap between the first edge and the second edge. A dome strut may be received within the engagement slot. The first edge and second edge may be configured to receive and retain a dome strut. The spoke may include a first arm and a second arm. The first and second edges of the engagement slot may be located on the first and second arms, respectfully. The engagement slot may have a third edge located on the first arm and an opposing fourth edge located on the second arm with another gap between the third and fourth edges. A support band may connect the third edge to the fourth edge. The dome strut band may traverse only the gap between the first edge and the second edge.

In some devices or methods herein, the spoke may flex in a direction normal to a longitudinal axis of the engagement slot. The strut band may be positioned at a first end of the spoke, wherein the first end is closer to the body than a second end. The strut band may be shaped and positioned to receive a cylindrical end of a dome strut. The dome hub may include four to six spokes. The strut may be tubular, such as a hollow cylinder.

In some devices or methods herein, the body of the dome hub may have a smooth top surface elevated above the support band. The body may have a plurality of ribs at the first end of the spoke. An inset may be formed by the ribs and may contact a portion of a strut end when assembled. A recessed convenience hole may be located in the center of the body. A disk may attach to the dome hub through the convenience hole.

Herein, a dome assembly kit has a strut and a hub. The hub has a body and a spoke extending radially from the body that receives and retains the strut within the spoke without threaded fasteners when assembled. The hub may also have a strut band that receives an end of the strut when assembled. By way of example, the spoke may retain the strut without a bonding material when assembled. The strut may have a depressible button biased in an extended position. The button may be positioned to retain the strut end against the strut band when the dome kit is assembled. The hub may be configured to receive the strut solely through an end of the spoke. The dome assembly kit may also have a disk that releasably connects to the hub when the dome kit is assembled. A first cover may be positioned over the hub when assembled. A second cover may be retained between a bottom surface of the hub and the disk when assembled.

Herein, a dome assembly method includes using a hub having a spoke and a strut band. The method includes using a strut having a first end and a second end. The strut is inserted into the spoke and retained within the spoke without threaded fasteners. The strut is slid toward a center of the hub until the first end of the strut is positioned against the strut band.

By way of example, the first end of the strut may be inserted into the spoke at an angle with respect to the spoke. The second end of the strut may be lifted and the strut pressed into the spoke. A disk may be releasably connected to the hub. A first cover may be positioned over the hub and a second cover may be retained between the disk and the hub.

FIG. 1 shows a hub 100 for use in dome construction. Hub 100 includes a body 110 and a plurality of spokes 120 extending radially from body 110. Each spoke in hub 100 shown in FIGS. 1 and 4-7 is identical and like features may be described by identical reference numerals, even though, for simplicity, duplicated features are not numbered for every spoke. Even so, it is conceivable that individual spokes in other hubs may differ from one another and, yet, still include some or all of the features described herein.

As appreciated from FIGS. 6 and 7 discussed below, a strut 170 may snap into spoke 120. Alternatively, strut 170 may slide into a second end 122 of spoke 120. Spoke 120 secures strut 170 to hub 100. Spoke 120 has a strut band 130, which receives a first end 171 of strut 170 when strut 170 is pushed toward body 110. If first end 171 of strut 170 is not in contact with strut band 130 when initially snapped into spoke 120, then strut 170 may be pushed toward body 110. Strut band 130 is a semi-circular band against which a cylindrical strut rests when fully pressed toward body 110. Alternatively, a strut band may be in a different position and/or have a different shape.

Body 110 and spokes 120 may be integrally connected to form a one piece hub 100. This may be accomplished by creating molds that can be injected with an appropriate material, such as ABS, ASA, or PVC.

As in FIG. 1, spoke 120 has a first end 121 closer to the center of body 110 than second end 122. The shape of spoke 120 permits strut 170 to be received within spoke 120. For example, spoke 120 may be sized and formed of a material sufficient to flex open to receive strut 170 and to flex closed to retain strut 170. Strut 120 may be shaped and positioned to receive a cylindrical strut 170. Strut band 130 may be positioned near first end 121 of spoke 120 and retain strut 170 within spoke 120.

Figure 2:
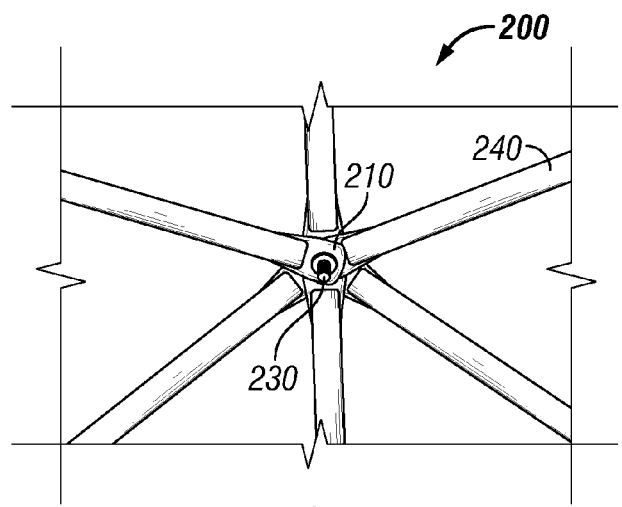
FIG. 2 is a prior art geodesic dome system having a plurality of struts with flattened ends joined together by a bolt.
Figure 3:
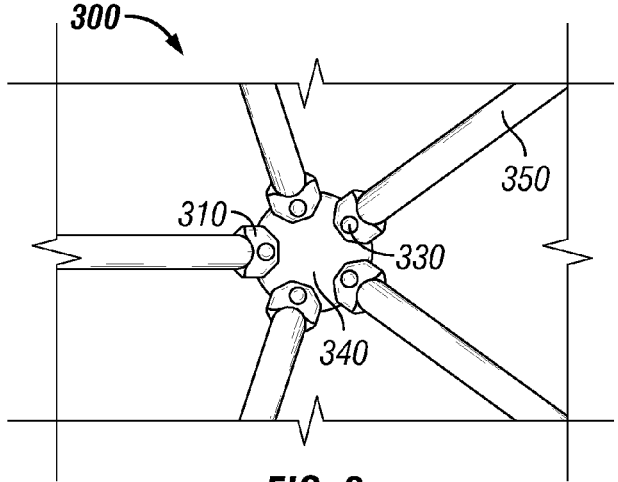
FIG. 3 is a prior art geodesic dome system having a plurality of struts with flattened ends joined together by a common disk and hardware.

FIGS. 2 and 3 show known geodesic dome joints. As shown in FIG. 2, a known design for a geodesic dome joint 200 is to flatten an end 210 of a strut 240. A hole (not shown) may then be drilled through the flattened end 210 of strut 240. The holes in struts 240 are then aligned and a bolt 230 passed through the holes and secured with a nut and washer. A builder may manipulate the angle between struts 240 before the nut is fully tightened onto bolt 230. This assembly method often requires multiple builders and tools, such as wrenches or screwdrivers, to assemble.

FIG. 3 illustrates another known geodesic dome joint 300 having struts 350 with flattened ends 310 and holes (not shown) formed therein. Instead of a single bolt being used to secure all of struts 350 together, each strut 350 is individually secured to a common disk 340 using a fastener 330, such as a rivet or bolt and nut. The angle between struts 350 can be adjusted by bending struts 350 or rotating about fastener 330. Similar to joint 200 shown in FIG. 2, joint 300 requires multiple builders and tools to assemble.

Use of joints 200 or 300 may result in substantially longer assembly times. In contrast, the hubs herein may be assembled without any hardware, such as bolts and nuts, or tools. For example, the devices herein might not use threaded fasteners or tools to retain strut 170 within hub 100. Also, the devices herein might not use bonding materials, such as epoxy or resin. Furthermore, hub 100 may be configured to receive first ends 171 of struts 170 that have not been flattened. This increases the stiffness of each joint for a given size of strut and reduces assembly time.

Figure 4:
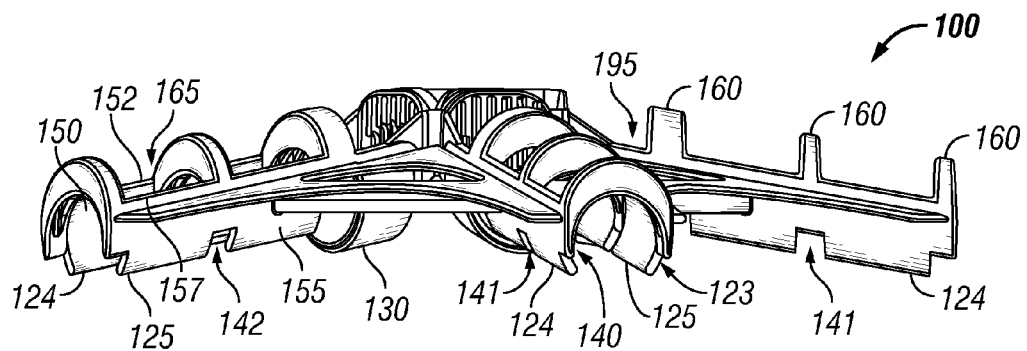
FIG. 4 shows a side view of the hub in FIG. 1.

Spoke 120 of FIG. 1 has an engagement slot 123, as shown in FIG. 4. Engagement slot 123 is defined by the side of spoke 120 extending along the length of spoke 120. Engagement slot 123 has a first gap 140 formed through the side of spoke 120 that is wide enough to allow for strut 170 to be pressed through first gap 140 as engagement slot 123 flexes until strut 170 rests within engagement slot 123. Together, the side of spoke 120 and first gap 140 formed through the side of spoke 120 create an open channel shape within which stut 170 rests when pressed through the side opening. The longitudinal length of first gap 140 may be between 1.5 inches and 8 inches, or some other length, depending on the dome size and purpose. First gap 140 is defined by a first edge 124 and a second edge 125 of engagement slot 123. Hub 100 may weigh less than 5 ounces when constructed of lightweight polymeric materials. Also, the use of a polymeric material such as nylon, ABS, ASA, PVC, or other similar materials may provide sufficient strength to support the applications for the dome, as well as flexibility to allow for some movement of hub 100 without failure. This may be beneficial when there are high winds or if a large object were to collide into the dome. This flexibility also allows first edge 124 and second edge 125 of engagement slot 123 to flex apart such that strut 170 may be pressed into engagement slot 123.

In some devices herein, a first slit 141 extends from first edge 124 and a second slit 142 extends from second edge 125 of engagement slot 123. Additional slits may be provided as shown in FIG. 4 at first edge 124 and second edge 125. Using one slit at first edge 124 and one slit at second edge 125 allows more flex in engagement slot 123. With no slits, engagement slot 123 would flex less in comparison. With additional slits, engagement slot 123 would flex more in comparison to the one-slit design.

Engagement slot 123 may form a type of open clasp that is slightly smaller than strut 170 retained within engagement slot 123. When strut 170 is pressed into place, the clasp flexes open to receive strut 170 and then encloses around strut 170, gripping strut 170 in place. A balance of rigidity to grip strut 170 and flexibility to receive strut 170, such as promoted with first slit 141 and second slit 142, may be designed to provide the described clasp. With the features of hub 100 described herein, the design of hub 100 may easily adjust the balance of rigidity and flexibility to allow for changes in type of use, material of construction, etc.

Engagement slot 123 may be open on only one side. In other configurations, spoke 120 may have a first arm 150 and a second arm 155 forming engagement slot 123. These arms reduce the weight of the hub when compared to a solid spoke configuration and permit design of flexing properties. As will be appreciated from the discussion below, the open spoke structure with first arm 150 and second arm 155 may be adjusted to allow more or less gripping pressure on strut 170 by the clasp formed from engagement slot 123.

Figure 5:
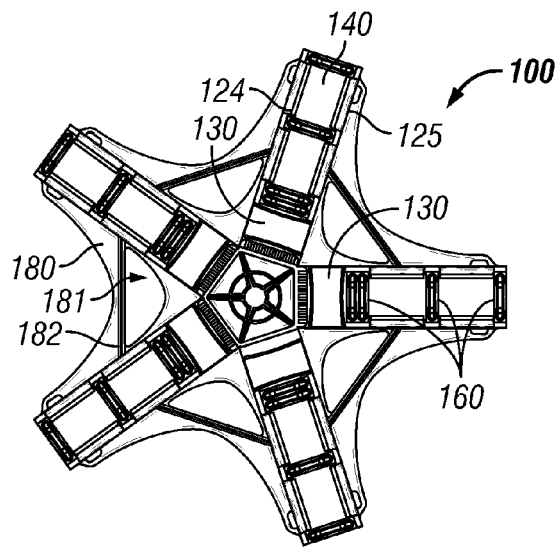
FIG. 5 shows a rear view of the hub in FIG. 1.

First arm 150 may be a first arc and second arm 155 may be a second arc partially defining a cylindrical engagement slot. Similar features on first arm 150 and second arm 155 may be equidistant from the center of engagement slot 123. First gap 140 is defined by first edge 124 of engagement slot 123 located on first arm 150 and second edge 125 of engagement slot 123 located on second arm 155, as shown in FIG. 5. First edge 124 of first arm 150 and second edge 125 of second arm 155 may flex to receive and retain strut 170 within engagement slot 123.

In some configurations, a third edge 152 of first arm 150 and a fourth edge 157 of second arm 155 may also form a second gap 165. Spoke 120 may include support bands 160 connecting third edge 152 of first arm 150 to fourth edge 157 of second arm 155. Support bands 160 may traverse second gap 165, but not traverse first gap 140 so that strut 170 may still be received within engagement slot 123. The dimensions and number of support bands 160 influences the flexibility of engagement slot 123 in receiving strut 170 as well as the flexibility of spoke 120 with respect to body 110 during and after dome assembly. An increased support band 160 width along the longitudinal direction of spoke 120 decreases flexibility. An increased thickness of support band 160 from engagement slot 123 upward also decreases flexibility. An increased number of support bands further decreases flexibility.

The angle between the adjacent spokes of a hub as well as the angle of downward slope may be determined by the specific dome design. For example, the dome may have a frequency 2 (2V), frequency 3 (3V), level 3 (L3), or other geodesic dome design with the spoke angles in the hub matched with the strut angles of one of the particular designs. Instead, the angle between adjacent spokes may be the average angle between struts for a desired dome design. Although the average angle may be the same between each spoke, the hub may flex to accommodate the different angles between struts for particular geodesic dome designs. For example, the same hub herein may be used in a 3V, 4V, and L3 geodesic dome because the spokes may flex and accommodate the somewhat different strut angles in one of the dome designs compared to the others.

The hub herein provides sufficient flexibility, due to the use of polymeric material and its design, to build domes of all sizes. For example, the spoke may flex such that the same hub configuration may be used to build a dome three feet in diameter or a dome sixty feet in diameter even though the different diameters produce a different angle of downward slope at the strut joints. The spoke may flex to press a strut into the spoke when a rigid spoke would be prohibited from doing so.

Even though the individual angles of the connecting poles/struts in a dome vary, domes herein are able to use just one hub design for all six-spoke joints, one hub design for all five-spoke hubs, and one hub design for all four-spoke hubs in the dome. The reason for this is that the hubs are flexible and the hub spokes are able to move enough to easily accommodate different angles. Individual spoke angles may be different from one another. Spokes may be labeled to identify the correct connecting configuration.

In one example shown in the FIGS. 1 and 4-9, strut band 130 is positioned near first end 121 of spoke 120. The end of strut 170 fits within strut band 130. Strut band 130 resists compressive loads that are transferred from the exterior of the dome. Strut band 130 may be at least 0.25 inches in width along the longitudinal direction of spoke 120, but may be as wide as 2 inches, or some other width, depending on the dome size and purpose. As seen in FIG. 4, strut band 130 may traverse first gap 140, but not traverse second gap 165.

A part of second gap 165 may include an opening 195 next to body 110 defined by an offset between strut band 130 and support band 160 closest to the center of body 110. Opening 195 may permit strut 170 to be inserted into spoke 120 from below into opening 195 at an angle before being snapped into place. Once strut 170 has been positioned within spoke 120, strut 170 slides toward the center of hub body 110 until a portion on first end 171 of strut 170 fits securely against strut band 130. The benefit of using opening 195 as described presents one reason for strut band 130 traversing first gap 140, but not traversing second gap 165. If strut band 130 traversed second gap 165, then it would cover part or all of opening 195. Strut 170 may be additionally secured within spoke 120 by button 173 (described below).

Spokes 120 may be connected with a webbing 180 to provide added support between spokes 120. Webbing 180 may contain web apertures 181 to reduce the weight of hub 100. An edge 182 of web aperture 181 may be thicker and provide additional support and rigidity as appreciated from the description herein. Tie apertures 190 shown in FIG. 6 may be provided at second ends 122 of spokes 120 and may be used in conjunction with a tie, such as a cable tie, to secure struts 170 to second ends 122 of spokes 120. A tie to apertures 190 beneficially increases the resistance to pushing strut 170 out between first edge 124 and second edge 125 at second end 122 of spoke 120.

Figure 6:
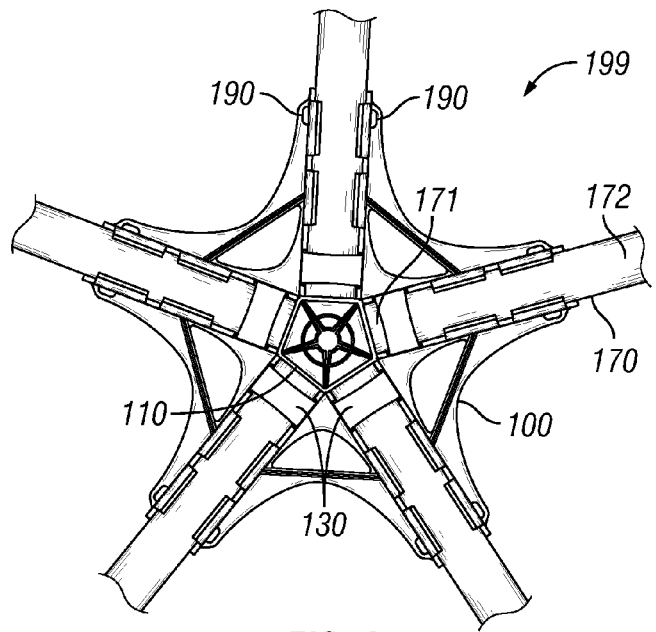
FIG. 6 shows a rear view of the hub in FIG. 1 with struts inserted.

FIG. 6 shows a joint 199 for constructing a dome. Joint 199 is created by retaining a plurality of struts 170 within hub 100. Unlike known dome joints, a dome using hub 100 and other hubs described herein may be assembled without tools. To assemble joint 199 a user first inserts strut 170 into spoke 120. The user then pushes strut 170 towards the center of hub body 110 until first end 171 of strut 170 is retained within strut band 130.

As one example, strut 170 is inserted into spoke 120 by passing strut 170 through first gap 140 in spoke 120. The edges of first gap 140 flex open to allow passage of strut 170 and flex closed to retain strut 170 within spoke 120. Stated another way, strut 170 is pressed through first gap 140 until it snaps into place.

As another example, strut band 130 and support band 160 closest to the center of body 110 may be offset and form opening 195. The user may insert first end 171 of strut 170 into opening 195 and lift a second end 172 of the strut until first end 171 rests against strut band 130. The user may then lift second end 172 until strut 170 is pressed into spoke 120.

Figure 7:
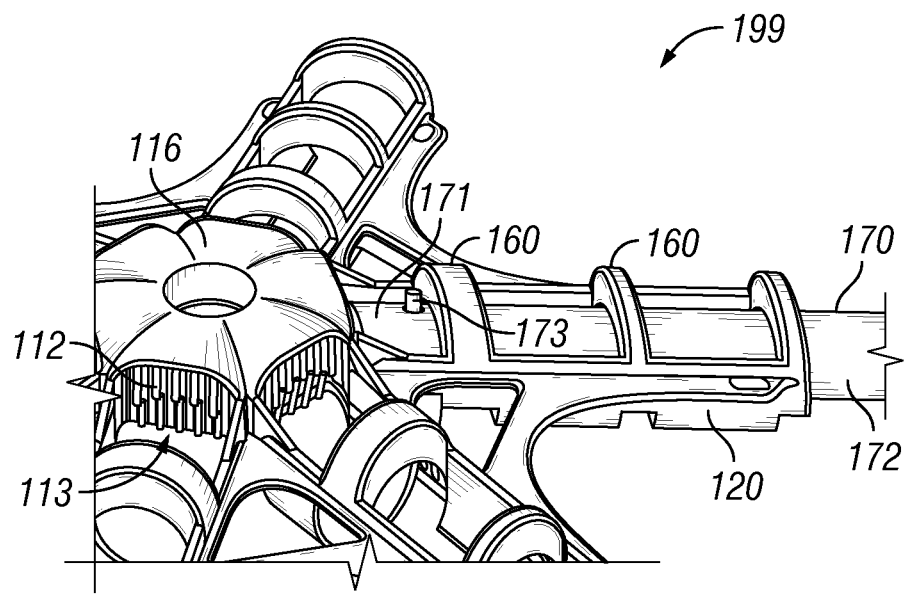
FIG. 7 shows a perspective view of a portion of the hub in FIG. 1 with a strut inserted having a button.

FIG. 7 illustrates a partially assembled dome joint 199. Hub 100 may join multiple struts 170 together. Struts 170 may be made out of aluminum alloy (such as aircraft grade 6000 or 7500 series alloys), steel, PVC, copper, thermoplastic pipe, or a number of other materials. Strut 170 may have a button 173. Button 173 may be biased in an extended position, such as by a spring. The user depresses button 173 while inserting strut 170 into spoke 120. Once the user has inserted first end 171 of strut 170 into strut band 130, button 173 returns to its biased extended position and retains strut end 171 against strut band 130. Button 173 rests against a portion of hub 100, such as support band 160, and provides tension pullout resistance for assembled joint 199. Support band 160 may include a notch (not shown) in which button 173 is positioned to reduce rotation of the strut within spoke 120. To remove strut 170, the user may depress button 173 and extract strut 170.

With the use of button 173, it is conceivable that spoke 120 may have a shorter length than shown in the Figures and strut 170 may be positioned within spoke 120 solely by sliding strut 170 into second end 122 of spoke 120. Instead of providing engagement slot 123, support bands similar or identical to support bands 160 may traverse first gap 140 from first edge 124 to second edge 125. The shorter length of spoke 120 may be sufficient to receive end 171 of strut 170 and secure strut 170 within spoke 120 by button 173 resting against a portion of hub 100. First gap 140 may beneficially reduce the weight of hub 100, but may not be configured to receive strut 170.

As discussed above, joints using the hubs herein provide a benefit over prior art joints and enable a single person to more efficiently build or disassemble a geodesic frame without the use of tools or hardware. For example, a dome 24 feet in diameter having 120 struts and 46 hubs may be built in approximately one to two hours. The dome may become completely freestanding without the use of tools or hardware. The same dome may be disassembled in approximately twenty minutes. If desired after assembling a freestanding, otherwise complete dome, then struts may be additionally secured by using tie apertures 190 and/or disk 470 (described below).

Figure 9:
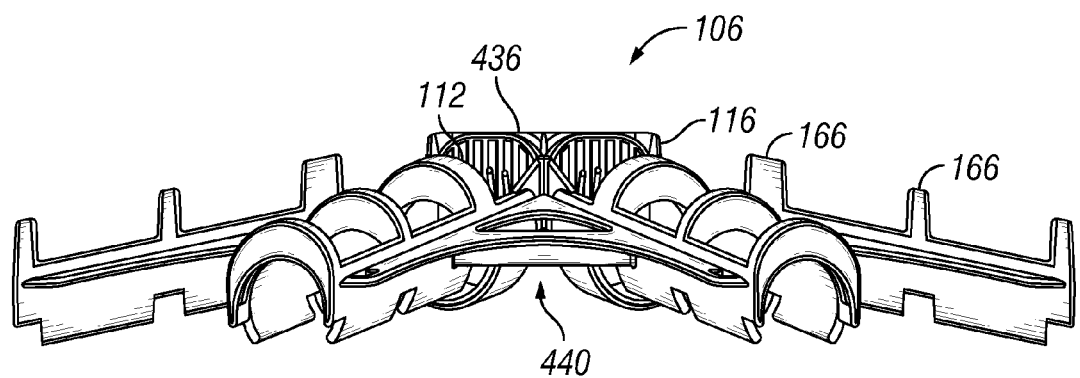
FIG. 9 shows a side view of the hub in FIG. 8.

Hub 100 may include stepped ribs 112 shown in FIGS. 7 and 9 on body 110 at first end 121 of spoke 120. Ribs 112 may form an inset 113 into which a portion of first end 171 of inserted strut 170 fits. Inset 113 resists tensile loads that are transferred from the interior of the dome. In other words, inset 113 reduces slipping between strut 170 and hub 100 when strut 170 is pushed into tension from inside the dome. Ribs 112 beneficially resist bending loads on the opposite ends of struts 170, such as during assembly. As one example, a cylindrical strut may be received within a semicircular inset and contact the inset only at the top portion of the strut end. A bottom portion of the cylindrical strut end may be retained against strut band 130 by inset 113.

Figure 8:
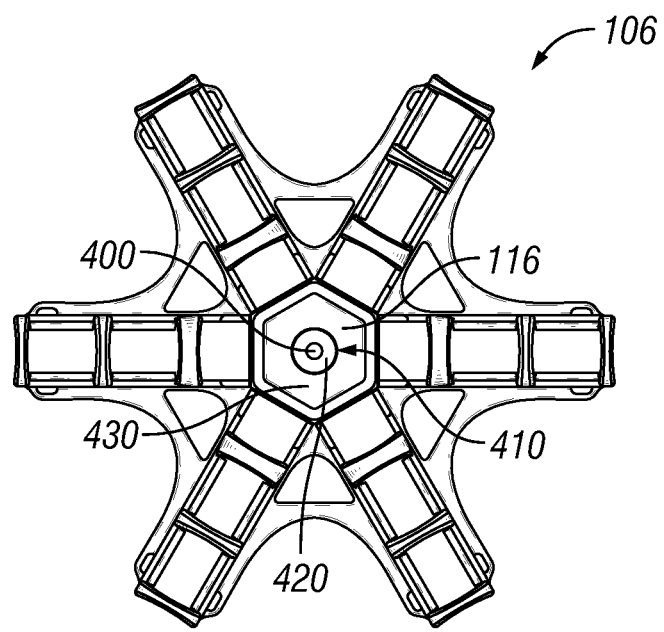
FIG. 8 shows a front view of a hub having 6 spokes.

FIGS. 8 and 9 show a hub 106 having six spokes 120. Other than including six spokes, hub 106 may include all the same features of hub 100 described herein adapted to six-spoke spacing. Likewise, hub 100 may include all the same features of hub 106 described herein adapted to five-spoke spacing. That is, hub 100 may include the same features of hub 106 discussed below. Other hubs may have a different number of spokes, such as four spokes. Spokes 120 may be equally spaced from one another or may be spaced differently. Hub 106 may include a recessed convenience hole 400 and a cavity 410 in the center of hub body 116. Convenience hole 400 may be threaded. Recessed convenience hole 400 enables the use of bolts and hooks for mounting and hanging items inside a constructed dome.

For example, recessed convenience hole 400 may be used to suspend growing pots or other equipment in domes used as green houses. In shelters, hooks in convenience hole 400 of hub 106 may be used to support hammocks and camping equipment. Assembled hub joint 199 may support at least 250 pounds of stress, such as 250 to 500 pounds of stress. It will be appreciated that higher loads may be possible with increased strut diameters and stronger strut and hub materials. Bolts and hooks may also be useful in supporting an insulation layer, such as made from polyethylene.

A top surface 436 of hub 106 may be smooth. Top surface 436 may be elevated above support band 166 and enable a first cover 460 (see FIG. 13) to lie on top of hub 100. Elevated top surface 436 reduces abrasion between first cover 460 and hub 106 and thereby reduces wearing or tearing of the cover. Recessed convenience hole 400 may have sufficient depth to contain a bolt head such that the head does not protrude beyond smooth top surface 436 of hub 106. Cavity 410 may contain a flat surface 420 on which a bolt head, washer, or other hardware may rest and thereby transfer weight throughout hub 106.

Figure 10:
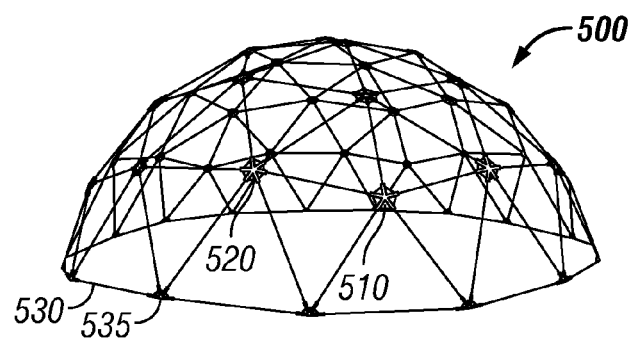
FIG. 10 shows a dome having a plurality of 5-spoke hubs and a plurality of 6-spoke hubs.
Figure 11:
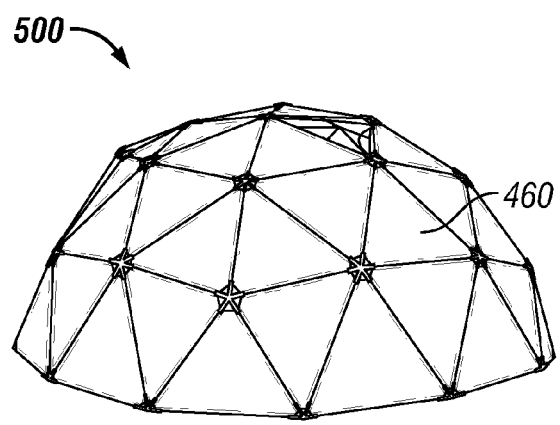
FIG. 11 shows the dome of FIG. 10 with a cover.

FIG. 10 shows a geodesic dome 500 constructed using devices and methods herein. For example, geodesic dome 500 may be created using five spoke hubs 510 and six spoke hubs 520 as shown. A base 530 for geodesic dome 500 may be created using partial hubs 535 accommodating a fewer number of struts, such as four, as shown. In light of the uses for domes disclosed above, it may be beneficial to provide covering 460 over the dome as shown in FIG. 11. Likewise, it may be beneficial to provide a covering 450 inside the dome, which may be accomplished through the use of a disk 470.

Figure 12:
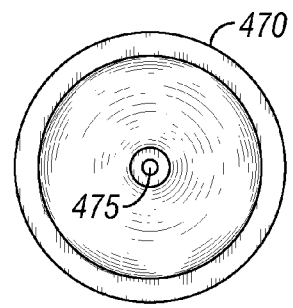
FIG. 12 shows a disk.

A disk 470, shown in FIG. 12, may be connected to hub 100. Disk 470 may have a concave shape that corresponds with the shape of a bottom surface 440 of hub 106. Disk 470 may be connected to convenience hole 400 of hub 100. Disk 470 may have a center hole 475 and a bolt may be passed through center hole 475 of disk 470 and convenience hole 400 of hub 100. A washer and nut may secure disk 470 to hub 100. By way of example, disk 470 may cover a portion of first gap 140 and lock strut 170 from disengaging with spoke 120. Disk 470 may provide support to hub 100 and resist the bending forces within strut 170.

Figure 13:
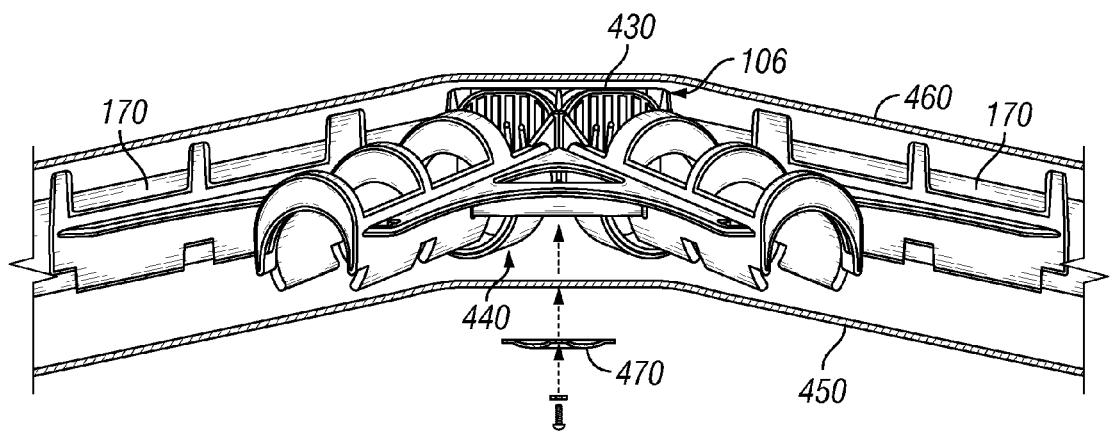
FIG. 13 shows a sectional view of a portion of a dome having a hub, a disk, a first cover, and a second cover.

FIG. 13 shows a dome assembly. Second cover 450 may be secured to the inside of a dome. Second cover 450 may be placed between disk 470 and hub 100, such that when disk 470 is connected to hub 100, second cover 450 is held securely in place. First cover 460 may also be placed over the dome. The cover material and the air cushion created between second cover 450 and first cover 460 provides insulation that may keep the space inside the dome warmer when the weather is cold and keep the space inside the dome cooler when the weather is hot. Additionally, first cover 460 may provide weatherproofing.

The hubs in the Figures are examples. Hubs may be larger or smaller, may be designed to hold struts of different diameters, and may be shaped to hold struts at different angles as will be appreciated from the description herein.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

| TABLE OF REFERENCE NUMERALS FOR FIGURES | |
| --- | --- |
| 100 | hub |
| 106 | six-spoke hub |
| 110 | body |
| 112 | stepped ribs |
| 113 | inset |
| 116 | six-spoke body |
| 120 | spoke |
| 121 | first end of spoke |
| 122 | second end of spoke |
| 123 | engagement slot |
| 124 | first edge of engagement slot |
| 125 | second edge of engagement slot |
| 130 | strut band |
| 140 | first gap |
| 141 | first slit |
| 142 | second slit |
| 150 | first arm |
| 152 | third edge of first arm |
| 155 | second arm |
| 157 | fourth edge of second arm |
| 160 | support band |
| 165 | second gap |
| 166 | six spoke support band |
| 170 | strut |
| 171 | first end of strut |
| 172 | second end of strut |
| 173 | button |
| 180 | webbing |

TABLE OF REFERENCE NUMERALS FOR FIGURES

| | |
|---|---|
| 181 | web aperture |
| 182 | edge of web aperture |
| 190 | tie aperture |
| 195 | opening between support band and strut band |
| 199 | dome joint |
| 200 | prior art joint |
| 210 | flattened end |
| 220 | drilled hole |
| 230 | fastener |
| 240 | strut |
| 300 | prior art joint |
| 310 | flattened end |
| 320 | drilled hole |
| 330 | fastener |
| 340 | common disk |
| 350 | strut |
| 400 | convenience hole of hub |
| 410 | cavity |
| 420 | flat surface of cavity |
| 430 | top surface |
| 436 | six spoke top surface |
| 440 | bottom surface |
| 450 | second cover |
| 460 | first cover |
| 470 | disk |
| 475 | center hole of disk |
| 500 | geodesic dome |
| 510 | five spoke hub |
| 520 | six spoke hub |
| 530 | base |
| 535 | partial hub |

What is claimed is:

1. A dome hub comprising:
    a body; and
    a spoke extending radially from the body, the spoke being configured to receive a dome strut, and having a first end, a second end, a side extending radially between the first end and the second end, and a strut band configured to receive an end of the dome strut, the first end being radially closer to the body than the second end, the spoke including a longitudinal engagement slot having a first edge and an opposing second edge with a gap therebetween, the gap of the longitudinal engagement slot extending from the second end towards the first end and being formed through the side of the spoke, the first edge and the second edge of the longitudinal engagement slot being configured to receive the dome strut through the gap of the longitudinal engagement slot from outside the spoke and the first edge and the second edge being configured to retain the dome strut within the longitudinal engagement slot.

2. The dome hub of claim 1, further comprising a tie aperture configured to receive a tie and retain the dome strut within the engagement slot.

3. The dome hub of claim 1, wherein the spoke comprises a first arm and a second arm, the first edge of the engagement slot being located on the first arm and the second edge of the engagement slot being located on the second arm.

4. The dome hub of claim 3, wherein the engagement slot has a third edge located on the first arm and an opposing fourth edge located on the second arm with another gap therebetween, the other gap extending from the second end towards the first end and being formed through the side of the spoke, the spoke further comprising a support band connecting the third edge to the fourth edge.

5. The dome hub of claim 4, wherein the strut band traverses only the gap between the first edge and the second edge.

6. The dome hub of claim 4, wherein the dome hub comprises a plurality of spokes, and the body has a smooth top surface elevated above all of the spokes.

7. The dome hub of claim 1, wherein the spoke is configured to flex in a direction normal to a longitudinal axis of the engagement slot.

8. The dome hub of claim 1, wherein the strut band is positioned at the first end of the spoke, the first end being closer to the body than the second end.

9. The dome hub of claim 8 the body further comprising a plurality of ribs positioned on the body at the first end of the spoke, the ribs forming an inset configured to contact a portion of an end of the dome strut.

10. The dome hub of claim 1, the body further comprising a recessed convenience hole located in a center of the body.

11. The dome hub of claim 10, further comprising a disk attached to the dome hub through the convenience hole, the disk being sized, positioned, and configured to resist bending forces in the dome hub.

12. The dome hub of claim 1, wherein the strut band is configured to receive a cylindrical end of the dome strut and the dome hub comprises four to six spokes.

13. A dome assembly kit comprising:
    a strut; and
    a hub having a body and a spoke extending radially from the body that receives and retains the strut within the spoke without threaded fasteners when assembled, the spoke having a strut band and a plurality of support bands, the strut band contacting a portion of a bottom surface of the strut when assembled, the plurality of support bands contacting portions of a top surface of the strut when assembled, wherein the support band radially closest to the body is positioned radially further from the body than the strut band, creating a radial opening between the body and the support band radially closest to the body.

14. The dome assembly kit of claim 13, wherein the spoke retains the strut without a bonding material when assembled.

15. The dome assembly kit of claim 13, wherein the strut further comprises a depressible button biased in an extended position, the button being positioned to retain the strut end against the support band radially closest to the body when assembled.

16. The dome assembly kit of claim 15, wherein the body includes a plurality of ribs positioned on the body, the ribs forming an inset configured to contact a portion of the top surface of the strut.

17. The dome assembly kit of claim 13, further comprising:
    a disk releasably connected to the hub when assembled;
    a first cover positioned over and covering all of a top of the hub when assembled; and
    a second cover retained between a bottom of the hub and the disk when assembled, the second cover covering all of the bottom of the hub when assembled.

18. The dome assembly kit of claim 17, further comprising:
    a recessed convenience hole located in a center of the body, the disk being connected to the hub through the convenience hole when assembled; and
    the body including a smooth surface of a top of the hub elevated above the recessed convenience hole and the support bands, the smooth surface contacting the first cover.

19. A dome assembly method comprising:

using a hub having a body and a spoke extending radially from the body, the spoke having a first end, a second end, and a side extending radially between the first end and the second end, the first end being radially closer to a center of the hub than the second end, the spoke including a longitudinal engagement slot having a gap extending from the second end towards the first end and being formed through the side of the spoke;

using a strut having a first end and a second end;

inserting the strut into the spoke through the gap of the longitudinal engagement slot, the strut being retained within the longitudinal engagement slot of the spoke by a first edge and a second edge of the gap and without threaded fasteners; and sliding the strut along a longitudinal axis of the longitudinal engagement slot toward the center of the hub.

20. The method of claim 19, wherein the first end of the strut is inserted into the spoke through the gap at an angle with respect to the spoke, the first end of the strut contacting a strut band, and the method further comprising lifting the second end of the strut and pressing the strut into the spoke through the gap.

21. The method of claim 19, further comprising releasably connecting a disk to the hub, the disk being sized, positioned, and configured to resist bending forces in the dome hub.

* * * * *